United States Patent [19]

Horino

[11] Patent Number: 5,046,123
[45] Date of Patent: Sep. 3, 1991

[54] ERROR SIGNAL DETECTION CIRCUIT IN A SERVO CONTROL DEVICE

[75] Inventor: Mamoru Horino, Hamamatsu, Japan

[73] Assignee: Yamaha Corporation, Hamamatsu, Japan

[21] Appl. No.: 239,997

[22] Filed: Sep. 1, 1988

[30] Foreign Application Priority Data

Sep. 7, 1987 [JP] Japan .................. 62-223789

[51] Int. Cl.$^5$ ............................... H62P 5/16
[52] U.S. Cl. ................. 388/814; 388/901; 388/910; 388/912; 388/915; 388/811
[58] Field of Search .................. 318/306–312, 318/314–315, 318, 329; 388/800, 809–815, 901, 912, 915, 910

[56] References Cited

U.S. PATENT DOCUMENTS

| | | | |
|---|---|---|---|
| 4,097,787 | 6/1978 | Larsson et al. | 318/332 |
| 4,242,619 | 12/1980 | Nakamura et al. | 388/811 |
| 4,283,671 | 8/1981 | Nakano et al. | 388/811 X |
| 4,511,830 | 4/1985 | Yamada et al. | 388/812 |
| 4,668,900 | 5/1987 | Tabuchi | 388/814 |
| 4,672,396 | 6/1987 | Pappas et al. | 388/814 X |
| 4,734,630 | 3/1988 | Okano | 388/811 X |
| 4,963,801 | 10/1990 | Yamazaki | 318/254 |

Primary Examiner—William M. Shoop, Jr.
Assistant Examiner—David Martin
Attorney, Agent, or Firm—Spensley Horn Jubas & Lubitz

[57] ABSTRACT

An error signal detection circuit in a servo control device comprises a reference signal generation circuit for selectively generating reference signals of different periods, each having a slope which changes from a reference value at a substantially constant gradient, an error detection timing generation circuit for generating timing of detection of an error signal of an object of control, an error signal detection circuit for generating an error signal by detecting the value of a reference signal generated by the reference signal generation circuit at a timing provided by the error detection timing generation circuit, and a slope varying circuit for varying the slope of the reference signal in accordance with the period of the reference signal. By changing the gradient of the slope of the reference signal in accordance with the reference period, the ratio of change of the error signal output to the error can be maintained substantially constant so that the gain of the servo loop can be maintained substantially constant and optimalization of the servo system can thereby be realized.

7 Claims, 7 Drawing Sheets

ERROR SIGNAL DETECTION CIRCUIT IN A SERVO CONTROL DEVICE

BACKGROUND OF THE INVENTION

This invention relates to an error signal detection circuit in a servo control device which produces a reference signal having a slope changing at a substantially constant gradient and obtains an error signal by detecting the value of the reference signal at a timing at which a detection signal from an object of control is obtained and, more particularly, to an error signal detection signal of this type capable of preventing change in the gain of servo loop when period of the reference signal has been changed.

As a prior art error signal detection method in a speed servo or rotational phase servo for a rotary drum or capstan in an R-DAT (rotary head type digital audio tape recorder), there is a method according to which an error signal is obtained by producing a reference signal having a slope which changes at a substantially constant gradient, detecting a rotation speed or rotational phase by an FG (frequency generator) or a PG (phase generator) provided on the rotary drum, and detecting the value of the reference signal at a timing at which the rotation speed or phase detetion signal is produced.

Figure 2:
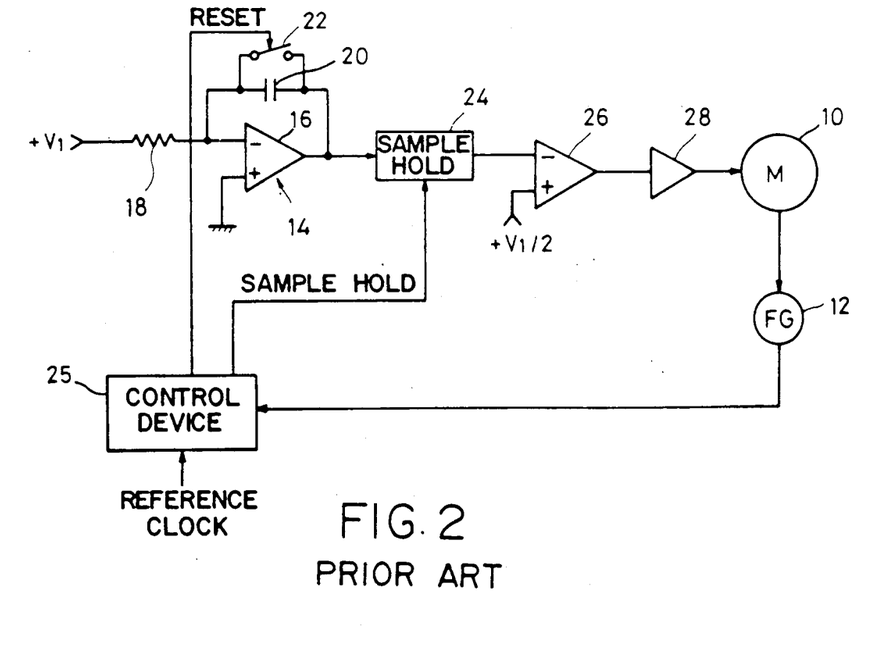
FIG. 2 is a block diagram showing the prior art error detection circuit.

FIG. 2 shows a prior art speed servo control device utilizing this error signal detection method. In FIG. 2, a motor 10 is an object of control which, for example, is a drum motor in an R-DAT. An FG 12 is directly coupled to the rotaion shaft of the motor 10 and produces a detection signal at a period obtained by equally dividing one revolution of the motor 10. An integrator 14 is constructed by connecting a resistor 18 and a capacitor 20 to an operation amplifier 16. A constant voltage V1 is applied to the capacitor 20 through the resistor 18 to charge the capacitor 20 and the output of the capacitor 20 is changed to V1 at a slope of a constant gradient. By turning on of a reset switch 22, the capacitor 20 is discharged and its ouptut is reduced to zero.

A control device 25 turns on the reset switch 22 to reset the integrator 14 and causes an immediately preceding integrated value to be held in a sample hold circuit 24 at a timing of generation of a detection signal by the FG 12. The control device 25 causes the integrator 14 to repeat the integration operation by turning on the reset switch 22 and turning off the reset switch 22 after a lapse of a predetermined period of time in accordance with the count of a reference clock. Length of time from turning on of the reset switch 22 till reaching of the integrated value to V1/2 after turning off of the reset switch 22 is determined to be the period of the reference signal (FG reference period). This FG reference period is determined by the length of time during which the reset switch is ON.

The voltage value held in the sample hold circuit 24 is applied to a comparator 26 in which an error between the voltage value and the reference value V1/2 is detected. This error signal is applied to the motor 10 through a servo amplifier 28 so as to control the sample held value to become V1/2 and thereby control the speed of the motor 10 so that the period of the detection signal by the FG 12 (FG detection period) will coincide with the FG reference period.

Figure 3:
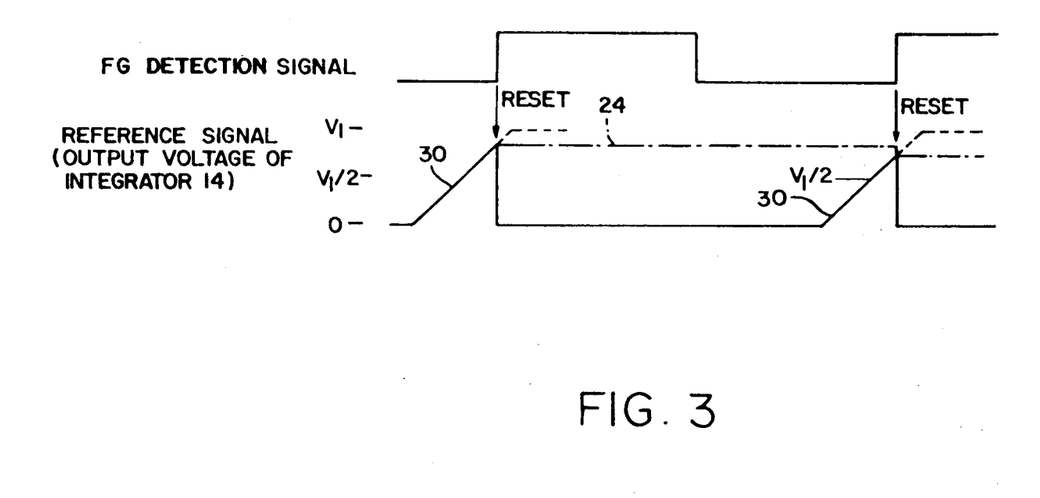
FIG. 3 is a waveform diagram showing the operation of the circuit of FIG. 1.

FIG. 3 illustrates the operation of the circuit of FIG. 2. The reference characters in FIG. 2 designate the followings:

t0: time during which the reset switch 22 is ON
$\tau$: slope time (time during which slope 30 reaches V1 from 0)
T0: FG reference period ($=t0+\tau/2$)
t: FG detection period
f: FG detection frequency (1/t)
v: speed error voltage
V1: maximum value of the speed error voltage The reference signal is reset at rising of the FG detection signal, increases after a lapse of time t0 at the slope 30 of a constant gradient and reset again at rising of next FG detection signal. The time T0 ($=t0+\tau/2$) from resetting till reaching to V1/2 is determined as the FG reference period. The value v of immediately before resetting is held in the sample hold circuit 24 and this value v is used as the speed error voltage for controlling the speed of the motor 10.

If the FG detection period t is longer than the reference period T0 (i.e., the motor speed is slower than the regular speed), the value v becomes $v > V1/2$ and the speed of the motor 10 increases whereas if the FG detection period t is shorter than the reference period T0 (i.e., the motor speed is faster than the regular speed), the value v becomes $v < V1/2$ and the speed of the motor 10 decreases. Thus, the motor speed is conrolled to a speed corresponding to the reference period T0.

Figure 4:
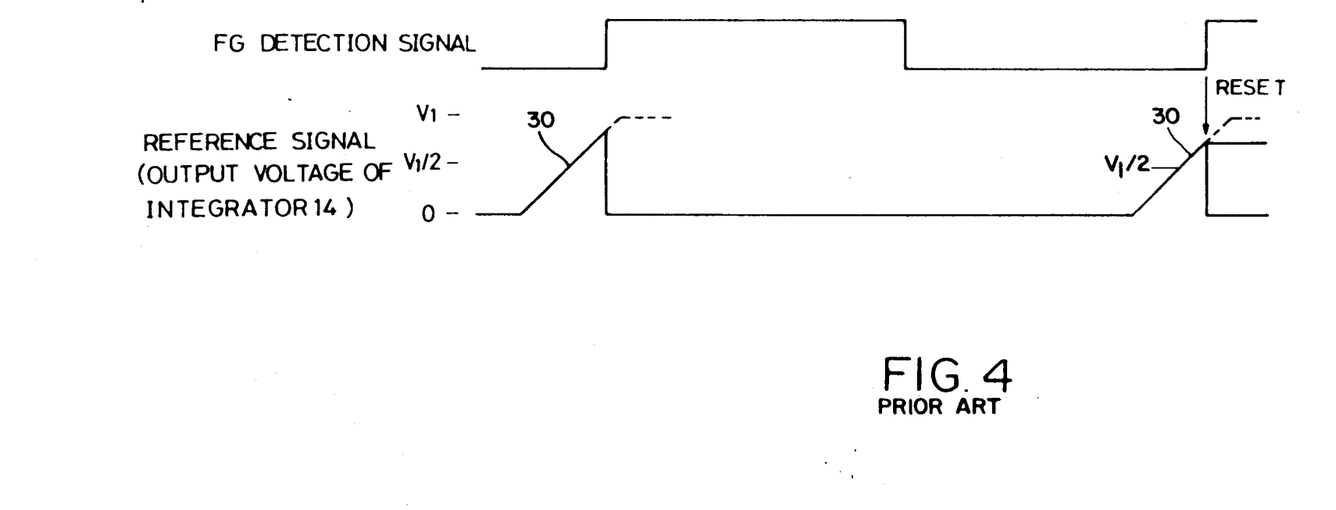
FIG. 4 is a waveform diagram showing the operation of the circuit of FIG. 1 when the reference period has been changed.

In the R-DAT, there are various playback modes such as a standard mode, a long time mode and a pre-recorded mode and also various operation modes such as a double speed playback and fast search. These modes can be realized by changing rotation speed of the rotary drum, capstan or reel table. In other words, each of these modes can be realized by changing the reference period T0 to a period corresponding to the rotation speed of the particular mode. In changing the reference period from T0 to T0' in the prior art device, as shown in FIG. 4, the time t0 is changed by T0'—T0 while retaining the gradient of the slope 30 unchanged.

In the prior art method in which, as described above, the reference period T0 is adjusted by the length of time t0 and the gradient of the slope 30 remains unchanged, the ratio of change of the speed error voltage v to the speed error varies which results in variation in the gain of servo loop which makes the servo system instable. For overcoming this problem and thereby realizing an optimum control in all speeds, a control is generally made for changing the gain in other portion of the circuit. This, however, requires a complicated circuit design. The same is the case with the phase servo.

It is, therefore, an object of the invention to provide an error signal detection circuit in a servo control device capable of preventing variation in the loop gain when the reference period is changed and thereby improving the stability of the servo system.

SUMMARY OF THE INVENTION

For achieving the object of the invention, the error signal detection circuit in a servo control device is characterized in that it comprises reference signal generation means for selectively generating reference signals of different periods, each having a slope which changes from a reference value at a substantially constant gradient, error detection timing generation means for generating timing of detection of an error signal of an object of control, error signal detection means for generating an error signal by detecting the value of a reference signal generated by said reference signal generation means at a timing provided by said error detection timing generation means, and slope varying means for varying the slope of the reference signal in accordance with the period of the reference signal.

According to the invention, by changing the gradient of the slope of the reference signal in accordance with the reference period, the ratio of change of the error signal output to the error can be maintained substantially constant so that the gain of the servo loop can be maintained substantially constant and optimatization of the servo system can thereby be realized. Besides, since the construction for changing the gradient of the slope can be readily realized by an integrated circuit, the requirement for providing an external circuit for changing the gain is obviated so that a control which is optimum for all speeds can be realized with a very simple circuit design.

Preferred embodiments of the invention will be described with reference to the accompanying drawings.

BRIEF DESCRIPTION OF THE DRAWINGS

In the accompanying drawings.

DESCRIPTION OF PREFERRED EMBODIMENTS

Embodiment 1

Figure 1:
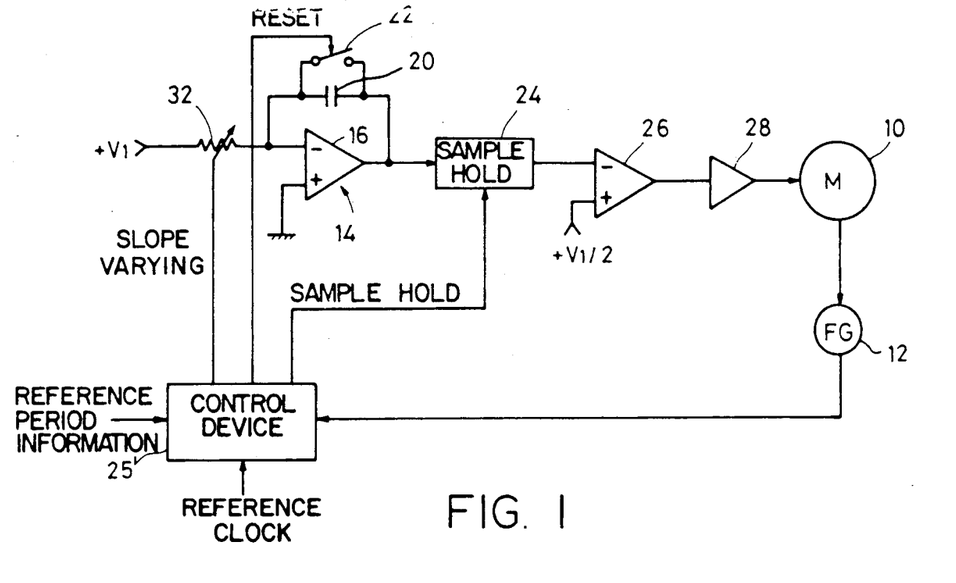
FIG. 1 is a block diagram showing an embodiment of the error detection circuit of the invention.

An embodiment of the invention is shown in FIG. 1. In this embodiment, the error detection circuit is shown as constructed of an analog circuit for convenience of explanation but, in actual circuit design, this circuit may be readily constructed as a digital circuit by constructing respective components of the circuit by digital circuits and employing a digital-to-analog converter and other device if required. In FIG. 1, the same component parts as those in FIG. 2 are designated by the same reference characters.

A motor 10 is an object of control which, for example, is a drum motor in an R-DAT. An FG 12 is directly coupled to the rotation shaft of the motor 10 and produces a detection signal at a period obtained by equally dividing one revolution of the motor 10. An integrator 14 is constructed by connecting a variable resistor 32 and a capacitor 20 to an operation amplifier 16. A constant voltage V1 is applied to the capacitor 20 through the variable resistor 32 to charge the capacitor 20 and the output of the capacitor 20 is changed to V1 at a slope of a constant gradient. By turning on of a reset switch 22, the capacitor 20 is discharged and its output is reduced to zero. The gradient of slope of the output of the integrator 14 is adjusted by the variable resistor 32.

A control device 25' turns on the reset switch 22 to reset the integrator 14 and causes an immediately preceding integrated value to be held in a sample hold circuit 24 at a timing of generation of a detection signal by the FG. 12. The control device 25' causes the integrator 14 to repeat the integration operation by turning on the reset switch 22 and turning off the reset switch 22 after a lapse of a predetermined period of time in accordance with the count of a reference clock. Length of time from turning on of the reset switch 22 till reaching of the integrated value to V1/2 after turning off of the reset switch 22 is determined to be the period of the reference signal (FG reference period).

The voltage value held in the sample hold circuit 24 is applied to a comparator 26 in which an error between the voltage value and the reference value V½ is detected. This error signal is applied to the motor 10 through a servo amplifier 28 so as to control the sample held value to become V½ and thereby control the speed of the motor 10 so that the period of the detection signal by the FG 12 (FG detection period) will coincide with the FG reference period.

For changing the FG reference period, the control device 25' changes the slope of the integrated output to a gradient corresponding to the reference period to be set by adjusting the variable resistor 32 in accordance with reference period information and also controls the time during which the reset switch 22 is ON so that the time from resetting the integrated output till reaching of next integrated output to V½ will become the reference period to be set.

In actual circuit design, the count of the control device 25', variable resistor 32, capacitor 20, reset switch 22, amplifier 16 and sample hold circuit 24 may be all constructed by digital LSI circuits.

In the circuit of FIG. 1, an operation when the reference period is T0 is assumed to be one shown in FIG. 3. In this case, conversion gain of the speed error voltage v is obtained from the FG detected frequency f(=1/t). In FIG. 3, since $$\frac{t - (T0 - \tau/2)}{\tau} = \frac{v}{V1},$$

from $t = 1/f$, $$V = \frac{V1}{\tau}\left[\frac{1}{f} - \left(T0 - \frac{\tau}{2}\right)\right]$$

From this formula, the conversion gain G of the speed error voltage v obtained from FG detected frequency f becomes $$G = \frac{dV}{df} = -\frac{V1}{\tau} \cdot \frac{1}{f}$$

If f=1/T0, the conversion gain G becomes $$G = -\frac{V1}{\tau} T0^2$$

In this formula, V1 is constant and, accordingly, the conversion gain G becomes constant by making $T0^2/\tau$ constant. Therefore, by adjusting the slope time $\tau$ so that $T0^2/\tau$ becomes constant according to the reference period T0 to be set, the loop gain becomes constant regardless of variation of the reference time T0. The ON time t0 of the reset switch 22 in this case is adjusted so that it becomes $t0=T0-\tau/2$ in accordance with the reference period T0 to be set and the slope time $\tau$ obtained in the above described manner.

Figure 5:
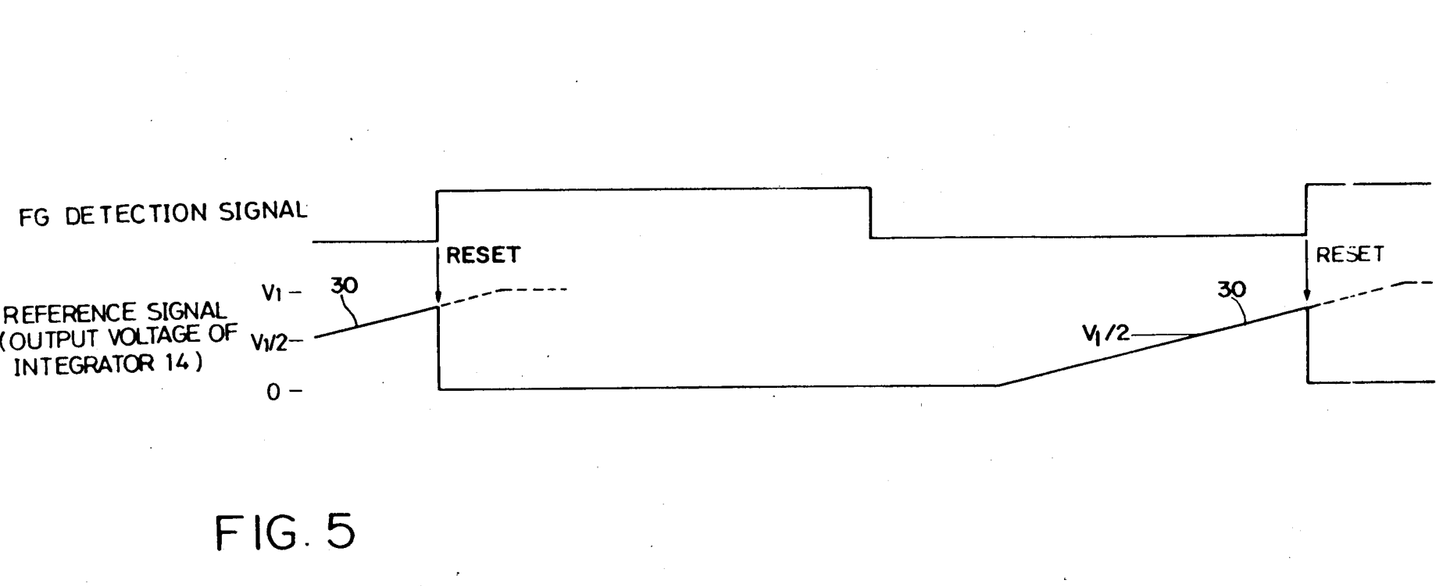
FIG. 5 is a waveform diagram showing the operation of the circuit of FIG. 1 when the reference period is doubled as compared with that in FIG. 3.

FIG. 5 shows a state in which the slope time $\tau$ and the ON time t0 of the reset switch 22 have been adjusted according to the above described principle when the reference period T0 is doubled as compared that in FIG. 3 in the control device of FIG. 1. From $T0^2/\tau=(2T0)^2/\tau'$, the slope time $\tau'$ is adjusted to $\tau'=4\tau$. The ON time t0' of the reset switch 22 is adjusted to $$t0' = 2T0 - 4\tau/2 = 2T0 - \tau$$

The foregoing description has been made about a case where the circuit of FIG. 1 has been applied to a speed servo. In a case where this circuit is applied to a phase servo, a PG which generates a pulse at a reference position of rotation of the motor is used instead of the FG 12 and a reference signal of the PG is applied as reference period information to the control device 25'. Resetting of the integrator 14 by the reset switch 22 which is made by the FG detection signal in the speed servo is made by the PG detection signal in the phase servo.

Figure 6:
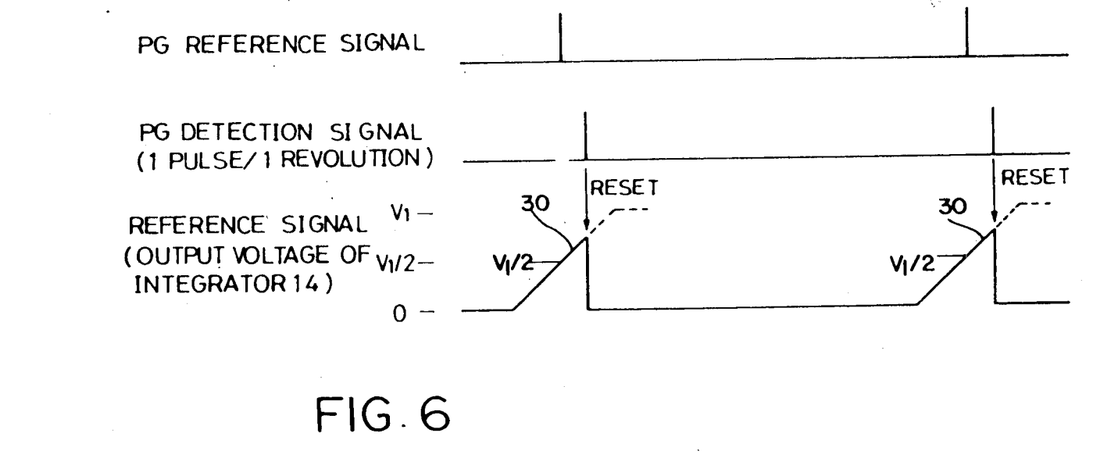
FIG. 6 is a waveform diagram showing the operation of the circuit of FIG. 1 when it is applied to the phase servo.

The operation in this phase servo is shown in FIG. 6. The reference characters in FIG. 6 designate the followings:
t0:ON time of the reset switch 22

$T^\theta$: slope time (time during which the slope 30 reaches from 0 to V1)

$$= \theta^\circ \left( = \frac{T\theta}{T0} \times 360^\circ \right)$$

t:PG detection period
v:phase error voltage
V1:maximum value of the phase error voltage
t1:phase error=$\theta^\circ$ The conversion gain of the phase error voltage v is obtained from the phase error $\theta^\circ$ in FIG. 6.
In FIG. 6, since $$\frac{v}{V1} = \frac{\theta^\circ/2 + \theta^\circ}{\theta^\circ}$$

the conversion gain G becomes $$G = \frac{dV}{d\theta} = \frac{V1}{\theta^\circ}$$

Since V1 is constant, the conversion gain G becomes constant by making the slope length $\theta^\circ$ constant. Accordingly, by adjusting the slope time $T\theta$ so that the slope length becomes constant (i.e., adjusting the gradient of the slope), the loop gain can be made constant regardless of variation in the reference period T0. The ON time t0 of the reset switch 22 is adjusted to $t0=T0-T\theta/2$ in accordance with the reference period T0 and the slope time $T\theta$ obtained in the above described manner.

Figure 7:
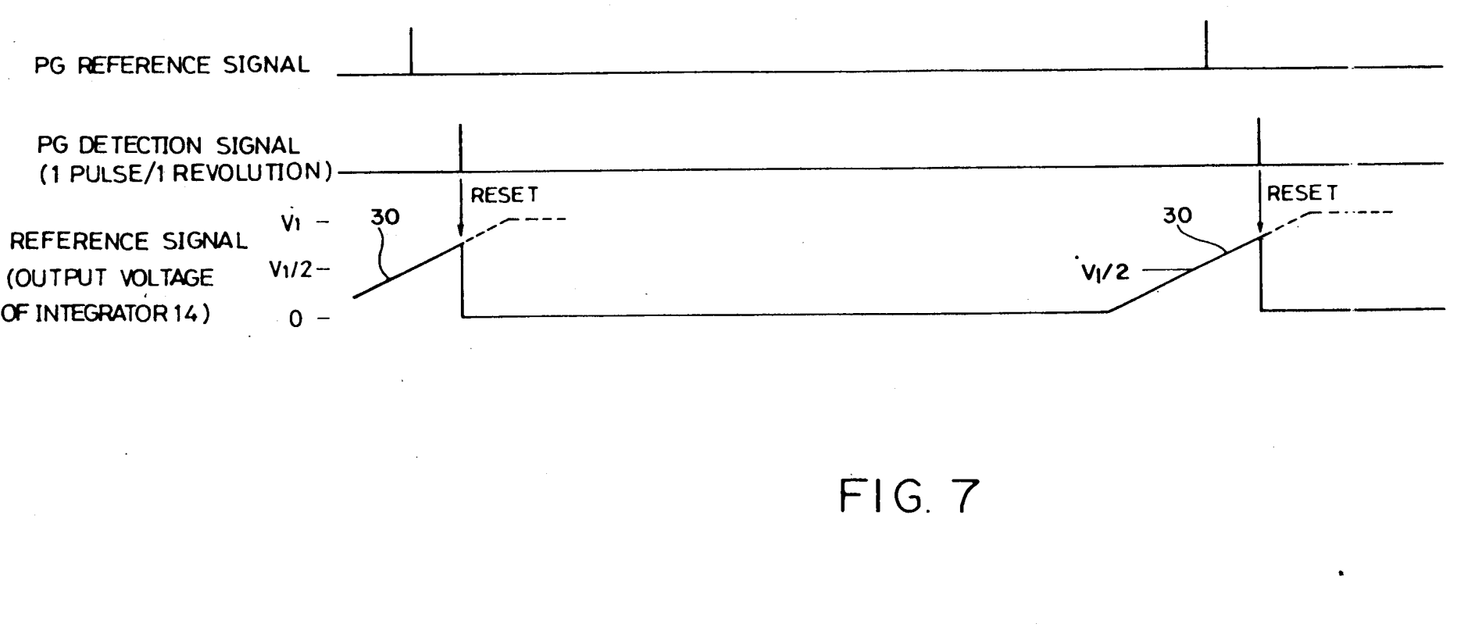
FIG. 7 is a waveform diagram showing the operation of the circuit of FIG. 1 when it is applied to the phase servo and the reference period is doubled as compared with that in FIG. 6.

FIG. 7 shows a state in which the slope time $T\theta$ and the ON time t0 of the reset switch 22 have been adjusted according to the above described principle when the reference period T0 is doubled as compared with that in FIG. 6. The slope time and the reset switch ON time t0 are both adjusted to double that of FIG. 6.

Embodiment 2

Another embodiment of the invention will now be described. In the above described embodiment, the error signal is provided in the form of a dc voltage. In the present embodiment, the error signal is provided as a PWM signal. This construction is particularly useful if the servo system is constructed of a digital circuit. In the present embodiment, description is made about a case where the circuit is applied to a capstan servo in an R-DAT.

Figure 8:
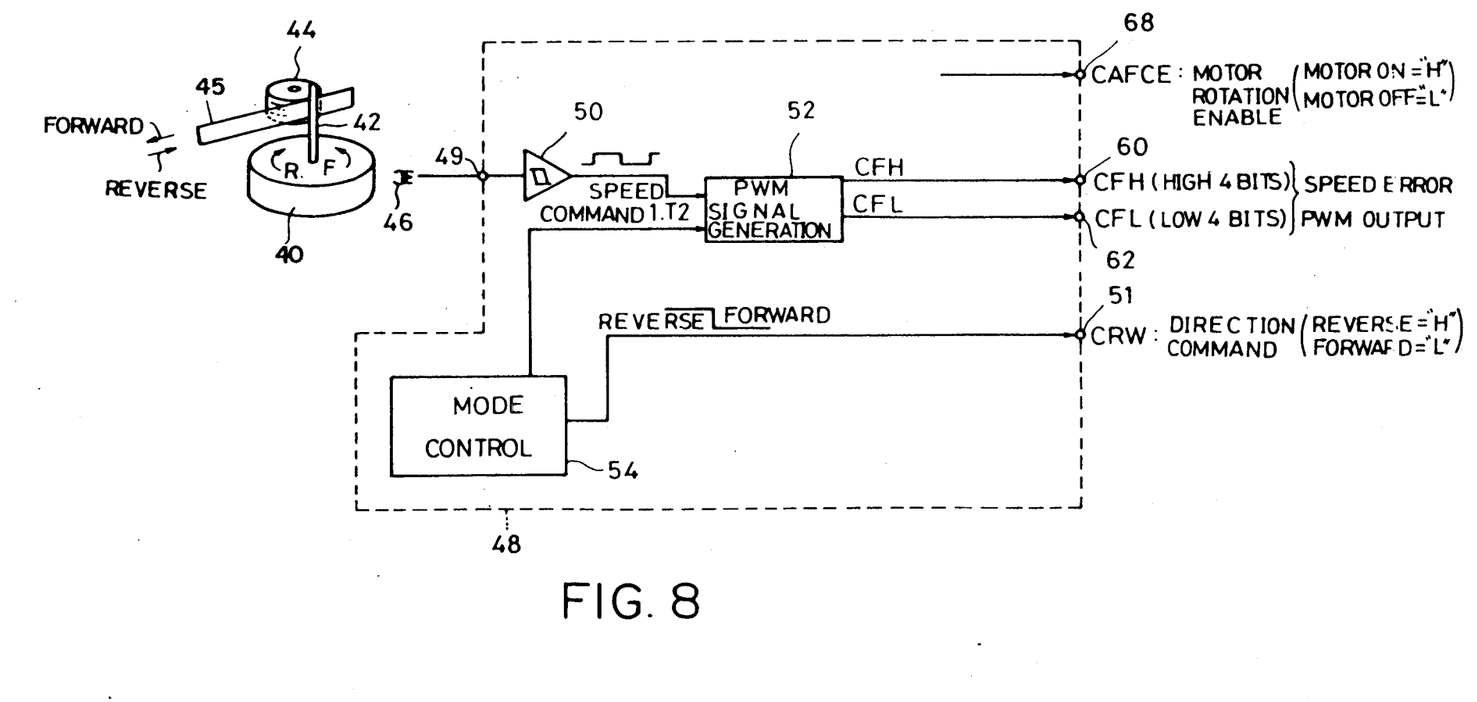
FIG. 8 is a block diagram showing a second embodiment of the invention in which this invention has been applied to the capstan servo of an R-DAT.

Referring to FIG. 8, a motor shaft 42 of a capstan motor 40 functions as the capstan. A pinch roller 44 is in abutting engagement with the capstan 42 and a tape 45 is caused to run between the capstan 42 and the pinch roller 44. The running direction of the tape 45 is changed by rotating the motor 40 forwardly or reversely and the running speed of the tape 45 is changed by changing the rotation speed of the motor 40. In this embodiment, description will be made on the assumption that the capstan motor 40 is made by a brushless motor.

An FG (frequency generator) 46 is provided for the rotation speed detection of the capstan motor 40. The FG 46 generates a pulse signal at a period determined by equally dividing one revolution of the motor 40. The period of this pulse signal constitutes speed detection information. This pulse signal does not contain rotation direction detection information.

The output pulse of the FG 46 is applied from an input terminal 49 to the motor driving signal output circuit 48, and is wave-shaped by a Schmidt circuit 50 and then applied to a PWM signal generation circuit 52.

A mode control circuit 54 produces a direction command CRW ordering forward rotation or reverse rotation of the motor 40 and time information T1, T2 constituting a rotation speed command in accordance with operation modes such as normal speed playback and double speed playback. The direction command CRW becomes "H" when reverse direction is ordered and "L" when forward rotation is ordered. The direction command CRW is directed to an output terminal 51 and the time information T1, T2 is applied to the PWM signal generation circuit 52.

The PWM signal generation circuit 52 compares the speed of the motor 40 detected from the FG output pulse with the speed command for the motor 40 provided by the time information T1, T2 generated by the mode control circuit 54 and thereupon produces an error signal of 8 bits, divides it into two bit groups of higher order 4 bits and lower order 4 bits and produces PWM signals CFH and CFL whose duty ratio changes in accordance with values of the respective bit groups.

By dividing the error signal into two bit groups as described above, the period of the PWM signals can be shortened to $\frac{1}{2}^4 = 1/16$ of a PWM signal produced from an undivided error signal while reference clock of the same period is used. These PWM signals CFH and CFL are directed to output terminals 60 and 62 and used for driving the motor 40. When the PWM signal is applied to the motor 40, the motor 40 is driven by an average level of the PWM signal so that its rotation speed increases as the duty ratio of the PWM signal increases.

A motor rotation enable signal CAFCE becomes "H" when motor rotation is enabled and "L" when it is disabled and is provided from an output terminal 58.

Figure 9:
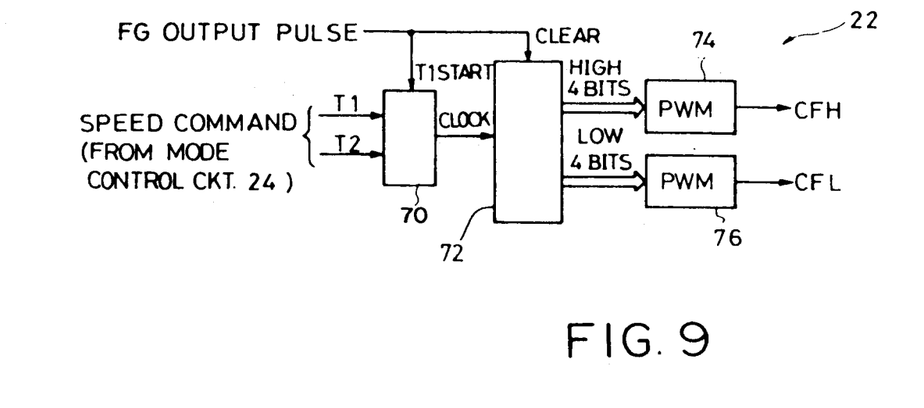
FIG. 9 is a block diagram showing a specific example of a PWM generation circuit 52 in FIG. 8.

A specific example of the PWM signal generation circuit 52 is shown in FIG. 9. A control circuit 70 receives the time information T1, T2 as the speed command from the mode control circuit 54 and the FG output pulse as a timing signal for starting counting of the time T1 and produces a clock signal. A counter 72 is counted up by this clock signal and cleared each time the FG output pulse is provided. The time information T1, T2 and the period of the clock signal are determined at such values that the count of the counter 72 immediately before being cleared becomes a predetermined count when the period of the FG output pulse is a regular period and, accordingly, the speed error is known by the count value immediately before being cleared.

The counter 72 consists of 8 bits and is capable of counting 256 times from 0 to 255. Upon reaching of the count to 255, the count stops at 255 even if the clock signal is applied further.

PWM circuits 74 and 76 receive respectively 4 higher order bits and 4 lower order bits of the count (8 bits) of the counter 42 immediately before being cleared and outputs PWM signals CFH and CFL having duty ratios corresponding to the respective values.

Figure 10A:
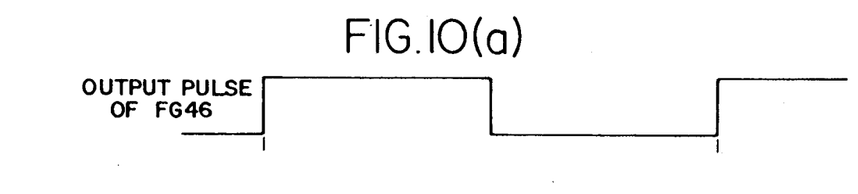
FIGS. 10a and 10b are waveform diagrams showing speed error detection operation by a counter 72 in FIG. 9.
Figure 10B:
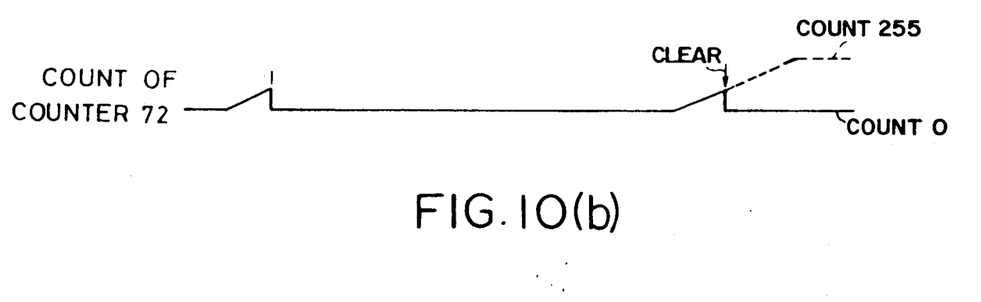

The speed error detection operation by the counter 72 is explained with reference to FIG. 10. Upon lapse of time T1 after resetting of the counter 72 by the FG output pulse, counting up is started by a clock signal of a predetermined period and the counter 72 is cleared by rising of next FG output pulse. In the counter 72, count 128 which is half of the maximum count is set as reference value and length of time from starting of counting to reaching count 128 is given as the time T2. (T1+T2) constitutes reference period of the FG output. Accordingly, when the period of the FG output coincides with this reference period (i.e., when there is no speed error), the counter 72 is cleared at count 128. If the detected speed is higher than the regular speed, the period of the FG output pulse is shortened so that the counter 72 is cleared at a smaller count than 128 whereas if the detected speed is lower than the regular speed, the period of the FG output is prolonged so that the counter 72 is cleared at a larger count than count 128. Accordingly, the speed error can be detected by the count of the counter 72 immediately before the counter 72 is cleared.

Since the speed of the capstan motor 40 must be changed depending upon the operation mode, the reference period (T1+T2) is adjusted depending upon the operation mode. An example of setting of the reference frequency of the FG output, the reference period (T1+T2) and time T1, T2 in respective operation modes is shown in the following Table 1:

TABLE 1

| Operation mode | Reference frequency (Hz) of FG output | Reference period T1 + T2 (mS) of FG output | T1 (mS) | T2 (mS) |
| --- | --- | --- | --- | --- |
| Recording & playback (0.5 TP) | 200 | 5.00 | 3.26 | 1.74 |
| Recording & playback (1 TP) | 400 | 2.50 | 2.06 | 0.44 |
| Playback (1.5 TP) | 600 | 1.67 | 1.45 | 0.22 |
| 4.5 multiple speed playback (0.5 TP) | 900 | 1.11 | 1.00 | 0.109 |
| same (1 TP) | 1800 | 0.556 | 0.529 | 0.027 |
| same (1.5 TP) | 2700 | 0.370 | 0.357 | 0.013 |

Remarks
0.5 TP: long time mode
1 TP: standard mode
1.5 TP: prerecorded tape mode (wide track)

In any mode, the period of the clock signal used for counting up is determined so that time from start of counting up till reaching count 128 becomes T2.

According to Table 1, the time T2 decreases as the reference time (T1+T2) decreases (T1 and T2 are determined so that $(T1+T2)^2/T2$ becomes substantially constant). If the time T2 is made constant (i.e., if the period of the clock used for counting up is made constant), ratio of the speed error to the count varies so that the gain of the speed servo loop varies with resulting variation in the servo characteristics. By determining the values of times T1, T2 in accordance with the reference period (T1+T2) so that $(T1+T2)^2/T2$ becomes substantially constant and determining the period of the clock signal used for counting up so that the count reaches the reference count 128 at the time T2, constant servo characteristics can be achieved in each operation mode.

Figure 11:
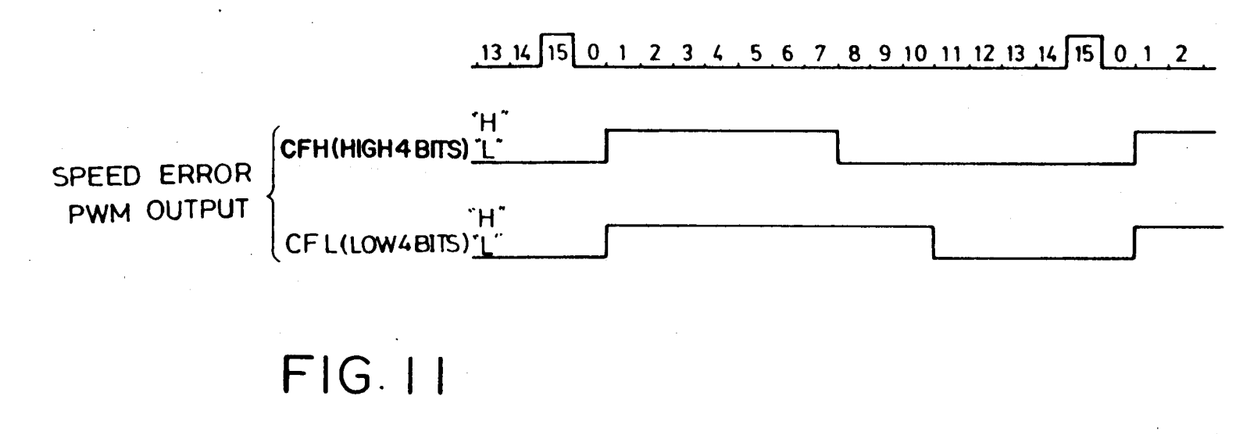
FIG. 11 is a waveform diagram showing an example of output PWM signals of PWM circuits 74 and 76 in FIG. 9.

The operations of the PWM circuits 74 and 76 of FIG. 9 generating the PWM signals in accordance with the speed error detected by the counter 72 in the foregoing manner will now be described with reference to FIG. 11. As described above, the PWM circuits 74 and 76 generate the PWM signals from the higher order 4 bits and the lower order 4 bits derived by dividing the 8 bit output of the counter 72. These PWM signals are provided as signals obtained by dividing one period of the PWM signal (e.g., 6.80272 μsec in case the frequency of the PWM signal is 147 KHz) by 16 which is a numerical value which can be expressed with 4 bits and maintaining "H" state during periods of time corresponding to numerical values of the higher order 4 bits and lower order 4 bits of the counter 72. In the example of FIG. 11, for example, PWM signals when the count of the higher order 4 bits is 7 and the count of the lower order 4 bits is 10 are shown. This corresponds to $7 \times 16 + 10 = 122$ counts as the count of the counter 72 and, in this case, the detected period is shorter than the count 128 (the higher order 4 bits are 8 and the lower order 4 bits are 0) which is the reference period, i.e., the detected speed is higher than the regular speed.

By the above described arrangement, the PWM signals CFH and CFL having duty ratio corresponding to the count of the counter 72 (i.e., the speed of the motor 10) are obtained. The PWM signals CFH and CFL are repeatedly produced with the same duty ratio until the counter 72 is renewed by generation of next FG output pulse.

By dividing the 8 bit output of the counter 72 into the higher order 4 bits and the lower order 4 bits to produce the PWM signals, the period of the PWM signal can be shortened and accuracy of an error signal thereby can be improved. If the PWM signal was not divided into the higher order bits and the lower order bits, the PWM signal provided would be a signal obtained by dividing the period of the PWM signal by 256 which corresponds to maximum numerical value that can be expressed with 8 bits and maintaining the state "H" during a period of time corresponding to the numerical value expressed by the 8 bit output of the counter 72. If the length of one divided section (i.e., reference clock period) is the same, the PWM signal which is not divided into the higher order bits and the lower order bits has a period which is 256/16 = 16 times as long as the period of the PWM signal which is divided into the higher order bits and the lower order bits (it is sufficient if the period is divided by 16). If the period is longer, accuracy of the error signal is adversely affected to that extent. This is why the output of the counter 72 is divided into the higher order bits and the lower order bits to produce the PWM signal.

Since the higher order 4 bits have weight which is 16 times as large as the lower order 4 bits, weight which is 16 times as large as that of the PWM signal CFL is given to the PWM signal CFH as will be described later when the motor 40 is driven by the PWM signals CFH and CFL.

Figure 12:
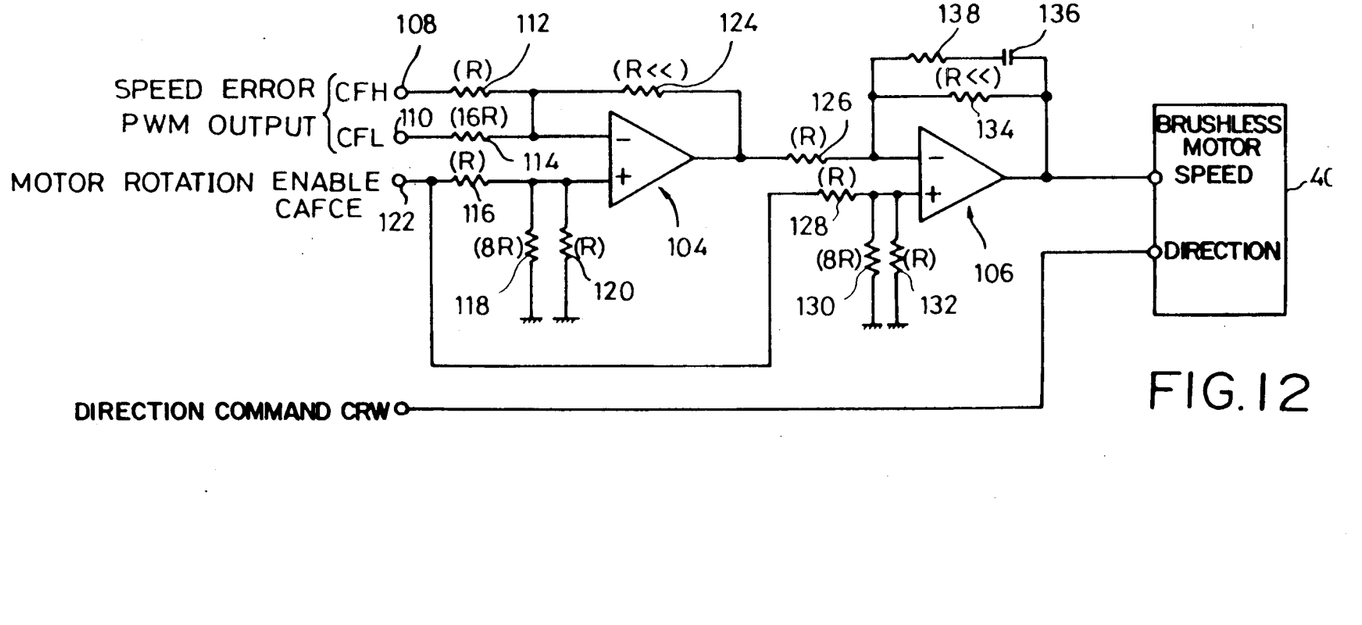
FIG. 12 is a circuit diagram showing an example of a circuit for driving a capstan motor constructed of a brushless motor by employing the drive circuit of FIG. 8.

FIG. 12 shows an example of a servo circuit used for driving the capstan motor 40 constructed of a brushless motor by the output of the circuit of FIG. 8. In this circuit, two amplifiers 104 and 106 are connected in series.

The amplifier 104 is an adding amplifer. The PWM signals CFH and CFL are applied to input terminals 108 and 110 and added together after being weighted at a ratio of 16:1 by resistances 112 and 114. The sum signal is applied to the inverting input terminal of the adding amplifier 104. The motor rotation enable signal CAFCE is applied from an input terminal 122 and a voltage obtained by voltage-dividing it with resistance 116 and parallel resistances 118 and 120 is applied to the non-inverting input terminal of the adding amplifier 104 as a reference voltage. The gain of the adding amplifier 104 is set at a relatively large value by resistance 124.

The output of the adding amplifier 104 is applied to an inverting input terminal of the amplifier 106. To the non-inverting input terminal of the amplifier 106 is applied, as a reference voltage, a voltage obtained by voltage-dividing the motor rotation enable signal CAFCE with resistance 128 and parallel resistances 130 and 132. The gain of the amplifier 106 is set at a relatively large value by resistance 134. Capacitor 136 and resistance 138 are provided for phase-compensation in the high frequency region. The motor 40 is controlled in its speed by the output of the amplifier 106 and also controlled in its rotation direction by the direction command CRW.

In these embodiments, description has been made in a case where the invention has been applied to an R-DAT. The invention however is applicable also to other devices having a function for changing the reference period. The invention is also applicable to purposes other than the motor control.

What is claimed is:

1. An error signal detection circuit in a servo control device comprising:
    reference signal generation means for selectively generating reference signals of different periods, each having a slope which changes from a reference value at a substantially constant gradient;
    error detection timing generation means for generating timing of detection of an error signal of an object of control;
    error signal detection means for generating an error signal by detecting the value of a reference signal generated by said reference signal generation means at a timing provided by said error detection timing generation means; and
    slope varying means for varying the slope of the reference signal in accordance with the period of the reference signal.

2. An error signal detection circuit as defined in claim 1 wherein said slope varying means varies the slope of the reference signal in accordance with the period of the reference signal so as to maintain gain of a servo loop substantially constant.

3. An error signal detection circuit as defined in claim 2 wherein said reference signal generation means comprises:
    an integration circuit inputting a predetermined voltage and outputting an integrated value of the input voltage; and
    switching means for resetting the output of said integration circuit when it is turned on and starting outputting of the integrated output from said integration circuit when it is turned off, the on-off states of said switching means being controlled by the output of said error detection timing generation means and the period of the reference signal being determined by length of time during which said switching means is ON.

4. An error signal detection circuit as defined in claim 3 wherein said slope varying means varies charging time constant of said integration circuit in accordance with the period of the reference signal.

5. An error signal detection circuit as defined in claim 4 wherein said error signal detection means comprises:
    a sample hold circuit for sampling and holding the value of the reference signal generated by said reference signal generation means at a detection timing generated by said error detection timing generation means; and
    a comparator for comparing the output of said sample hold circuit with a predetermined reference voltage,
    said object of control being controlled in accordance with result of comparison by said comparator.

6. An error signal detection circuit as defined in claim 2 wherein said error signal detection means counts a pulse of a predetermined frequency within a predetermined time interval of FG output pulse generated in accordance with rotation of a motor and produces an error signal in accordance with count of the pulse.

7. An error signal detection circuit as defined in claim 6 wherein said count is divided into higher order bits and lower order bits, the pulse signal of the predetermined frequency is pulse-width modulated in these divided bits and averaged analog signals thereof are weighted in either the higher order bits or the lower order bits at a predetermined ratio and added together, said motor being driven by the sum signal of said addition.

* * * * *